UNITED STATES PATENT OFFICE 2,130,990

CHLORO-ARYL ETHERS OF ETHYLENE GLYCOL

Gerald H. Coleman and George B. Stratton, Midland, Mich., assignors to The Dow Chemical Company, Midland, Mich., a corporation of Michigan No Drawing. Application April 28, 1937, Serial No. 139,582

4 Claims. (Cl. 260—613)

This invention concerns certain nuclear chlorinated aryl ethers of ethylene glycol and a method of making the same.

The new ethers herein disclosed have the general formula

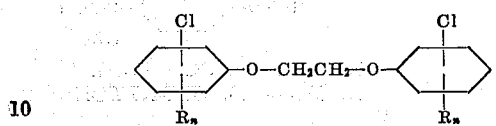

wherein R represents hydrogen, chlorine, or an alkyl radical and $n$ is an integer having a value from 1 to 4. The ethers having said formula are in many instances crystalline solids at room temperature although certain of the nuclear alkylated ethers are obtained in liquid form. They are useful as ingredients in dielectric or resin compositions and may also be employed as chemical agents from which a variety of other organic compounds may be prepared.

The ethers having the above formula are prepared by heating an ethylene halide to a reaction temperature with a metal salt of a nuclear chlorinated phenol of the benzene series (or a mixture of the corresponding chloro-phenol and a metal hydroxide) in the presence or absence of a reaction medium such as water, benzene, etc. Among the various nuclear halogenated phenols which may be employed in the reaction are 2,4-dichloro-phenol, chloro-cresol, diethyl-chloro-phenol, 2-tertiary-butyl-4-chloro-phenol, 2-methoxy-4-chloro-phenol, etc. The metal hydroxide is preferably an alkali metal compound, e. g. sodium or potassium hydroxide, although other metal hydroxides such as calcium or barium hydroxide may be used.

In practicing the invention, a mixture of an ethylene halide, e. g. ethylene chloride or ethylene bromide, with a chloro-phenate containing two or more nuclear substituents (or the corresponding chloro-phenol and a metal hydroxide in amounts sufficient to form such proportion of the chloro-phenate) are heated in the presence or absence of a reaction medium to a reaction temperature. Approximately 2 moles or more of chloro-phenate is preferably employed per mole of the ethylene halide, but the reactants may be used in other proportions if desired. The reaction usually occurs smoothly when a mixture is heated at atmospheric pressure to temperatures between 75°–125° C., but it may be carried out under pressure and at higher temperatures if desired. The time of heating required to complete the reaction may vary from a few minutes to a day or longer depending upon the phenolic reactant employed, the temperature at which the reaction is carried out, etc. The ether product is separated by conventional procedure, e. g. distillation or crystallization.

The following examples illustrate several ways in which the principle of the invention has been applied, but are not to be construed as limiting the invention:

Example 1

A mixture of 1 gram mol of 2,4-dichloro-phenol, 1 gram mol of ethylene chloride and 5.5 gram mols of water was heated under reflux at temperatures between 74.5° and 93° C. for 50 hours, after which the mixture was cooled, washed with water, and the lower boiling constituents of the mixture, e. g. dichloro-phenol, ethylene chloride, dichloro-phenoxy-ethyl chloride, etc., were distilled off leaving a residue of 1,2-di-(2,4-dichloro-phenoxy)-ethane as the still residue. The latter was purified by recrystallization from benzene. The purified 1,2-di-(2,4-dichloro-phenoxy)-ethane was a white, crystalline compound melting at approximately 132°–133° C. and having the formula

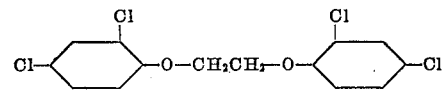

Example 2

A mixture of 1 gram mol of 2,4,6-trichloro-phenol, 1 gram mol of ethylene chloride, and 11.1 gram mols of water was heated under reflux at a temperature between 73°–88° C. for 66 hours, after which the resultant 1,2-di-(2,4,6-trichloro-phenoxy)-ethane product was separated and purified as in Example 1, except that the solvent employed in crystallizing the product was a mixture of benzene and ethyl alcohol. Said product was a white crystalline compound melting at approximately 167°–167.5° C. and having the formula

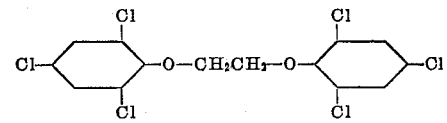

Example 3

1 gram mol of 2-chloro-4-tertiary-butyl-phenol, 1 gram mol of ethylene chloride and 11.1 gram mols of water were heated at temperatures between 77°–98.4° C. for 24 hours, after which the mixture was cooled, washed with water, and distilled to separate the 1,2-di-(2-chloro-4-tertiary-butyl-phenoxy)-ethane product. The later was a white crystalline compound, boiling at temperatures between 245° and 253° C. under 4.5 millimeters pressure, melting at 105.5°–106.5° C. and having the formula

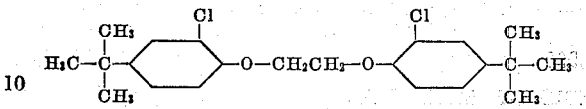

Other ether products having the phenol formula hereinbefore stated may be prepared by similar procedure. For instance, 1,2-di-(2-chloro-4,6-diethyl-phenoxy)-ethane may be prepared by reacting sodium 2-chloro-4,6-diethyl-phenate with ethylene bromide; 1,2-di-(2-chloro-4-tertiary-amyl-phenoxy)-ethane may be prepared by reacting 2-chloro-4-tertiary-amyl-phenol with ethylene chloride in the presence of sodium hydroxide, etc.

Other modes of applying the principle of the invention may be employed instead of those explained, change being made as regards the method or compound herein disclosed, providing the steps or compounds stated by any of the following claims or the equivalent of such stated steps or compounds be employed.

We therefore particularly point out and distinctly claim as our invention:

1. An ether having the general formula

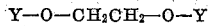

wherein Y represents a nuclear chlorinated aromatic hydrocarbon radical of the benzene series.

2. 1,2-di-(2,4-dichloro-phenoxy)-ethane, a white crystalline compound melting at approximately 132°–133° C. and having the formula

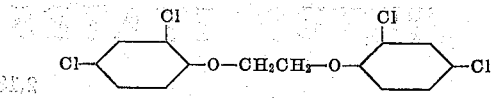

3. 1,2-di-(2,4,6-trichloro-phenoxy)-ethane, a white crystalline compound melting at a temperature approximately 167°–167.5° C. and having the formula

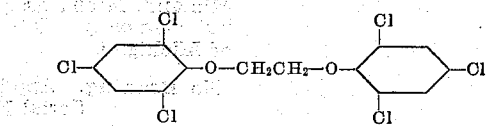

4. 1,2-di-(2-chloro-4-tertiary-butyl-phenoxy)-ethane, a white crystalline compound melting at a temperature approximately 105.5°–106.5° C. and having the formula

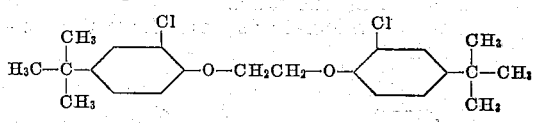

GERALD H. COLEMAN.
GEORGE B. STRATTON.